United States Patent [19]

Hoof

[11] 4,267,045
[45] May 12, 1981

[54] LABYRINTH DISK STACK HAVING DISKS WITH INTEGRAL FILTER SCREENS

[75] Inventor: Robert G. Hoof, Irvine, Calif.

[73] Assignee: The Babcock & Wilcox Company, New Orleans, La.

[21] Appl. No.: 103,256

[22] Filed: Dec. 13, 1979

Related U.S. Application Data

[63] Continuation of Ser. No. 955,050, Oct. 26, 1978, abandoned.

[51] Int. Cl.³ .................... B01D 25/18; F16K 47/08
[52] U.S. Cl. ........................... 210/322; 137/625.37; 138/42; 210/488; 210/492; 210/498; 251/127
[58] Field of Search .................. 137/625.3, 625.37; 138/42; 210/322, 323 R, 447, 488, 492, 498; 251/127

[56] References Cited

U.S. PATENT DOCUMENTS

| Re. 18,114 | 6/1931 | Lundborg | 210/488 X |
| 678,858 | 7/1901 | Bonvillain | 210/492 |
| 3,397,794 | 8/1968 | Toth et al. | 210/498 X |
| 3,514,074 | 5/1970 | Self | 251/127 |
| 3,648,843 | 3/1972 | Pearson | 210/488 X |
| 3,700,111 | 10/1972 | Bode | 210/488 X |
| 3,856,049 | 12/1974 | Scull | 251/127 X |
| 3,954,124 | 5/1976 | Self | 251/127 X |
| 4,068,683 | 1/1978 | Self | 251/127 X |

FOREIGN PATENT DOCUMENTS 837627  6/1960  United Kingdom .................... 210/488

Primary Examiner—Robert H. Spitzer
Attorney, Agent, or Firm—Vytas R. Matas

[57] ABSTRACT

A multi-turn labyrinth disk (10) is provided for a pressure reduction disk stack (12) which has an integral filter screen (34). The filter screen (34) comprises a series of small area passages ($A_2$) located on the periphery of the disk (10) which lead to a common high capacity radial passage (32) used to supply a series of multi-turn labyrinth paths (18).

5 Claims, 4 Drawing Figures

LABYRINTH DISK STACK HAVING DISKS WITH INTEGRAL FILTER SCREENS

This is a continuation of application Ser. No. 955,050, filed Oct. 26, 1978, now abandoned.

TECHNICAL FIELD

The present invention relates to labyrinth disk stacks generally and particularly to disks comprising such disk stacks wherein the disks have an integral filter screen.

BACKGROUND ART

In labyrinth disk stacks which are used for pressure reduction the fluid flow may be from the inside diameter of the disk stack to the outside diameter of the disk stack or from the outside to the inside. The latter is usually selected if the fluid passing through the disk is apt to be contaminated with solid particles. In this manner the solid particles too large to pass through the disk passages collect on the larger diameter where they are more easily removed and are less apt to interfere with other valve parts frequently located in the inner diameter.

Passages in the disk may be of uniform cross section area for fluids which do not expand with reducing pressure or may be designed to expand at a precise rate with each turn to control the velocity as a fluid expands with reduced pressure. In either instance design performance of the device is highly dependent on the relative cross section area of each passage and any major disturbance thereto can seriously affect the efficiency of that passage and even lead to destructive velocities, due to the fact that a reduction in passage area means higher pressure drop and higher velocity at that point.

Since the fluids that such a stack will handle often have dirt particles therein, such dirt particles tend to block or restrict the inlets to the fluid passages thereby reducing flow through the disk stack passageways and increasing the pressure drop across the inlets to the passageways. The increased pressure drop wedges the dirt particles into the inlets of the passageways as well as the passageways themselves making any cleaning operations, such as back-flushing, or other cleaning difficult if not impossible. The blocked inlets and passages are progressively rendered ineffective and the partial openings of the passageways tend to erode the passageways due to the increased velocity of the fluid flowing through the partially blocked passageways.

The placing of separate screens and filters along the periphery of the disk stack is expensive and cumbersome since it requires not only an extra part to be added to the disk stack but also adds another assembly step thereby escalating the cost of the disk stack. Also the blockage of a part of the screen renders the covered labyrinths of the stack inoperative.

SUMMARY OF THE INVENTION

The present invention solves the problems associated with known prior art devices as well as other by providing disks for a disk stack which disks have an integral filter screen. This integral filter screen includes a multitude of reduced area inlets which allow low velocity fluid flow into a common high capacity circumferential passage proximate to the integral screen which radial passage is used to feed the various multi-turn labyrinth passageways of the disk stack. The low velocity and small pressure drop across this integral filter screen reduces any tendency for dirt particles to stick in the filter inlets or openings thereby preventing the lodging of the particles and allowing easier cleaning and back-flushing. The high capacity circumferential passage feeding the various multi-turn labyrinth passageways allows up to 70 to 80 percent of the filter inlets or openings to be blocked before disk performance is impaired since the radial passage will feed all of the labyrinth passageways.

In view of the foregoing, it will be seen that one aspect of the present invention is to provide a multi-turn disk for a disk stack having an integral dirt particle filter screen.

Yet another aspect of the present invention is to provide a multi-turn disk for a disk stack having an integral filter screen wherein the blockage of a large portion of the filter screen will not impair the performance of the disk stack.

These and other apsects of the present invention will be more clearly understood from a review of the following description of the preferred embodiment when considered with the accompanying drawings.

DESCRIPTION OF THE PREFERRED EMBODIMENT

Figure 1:
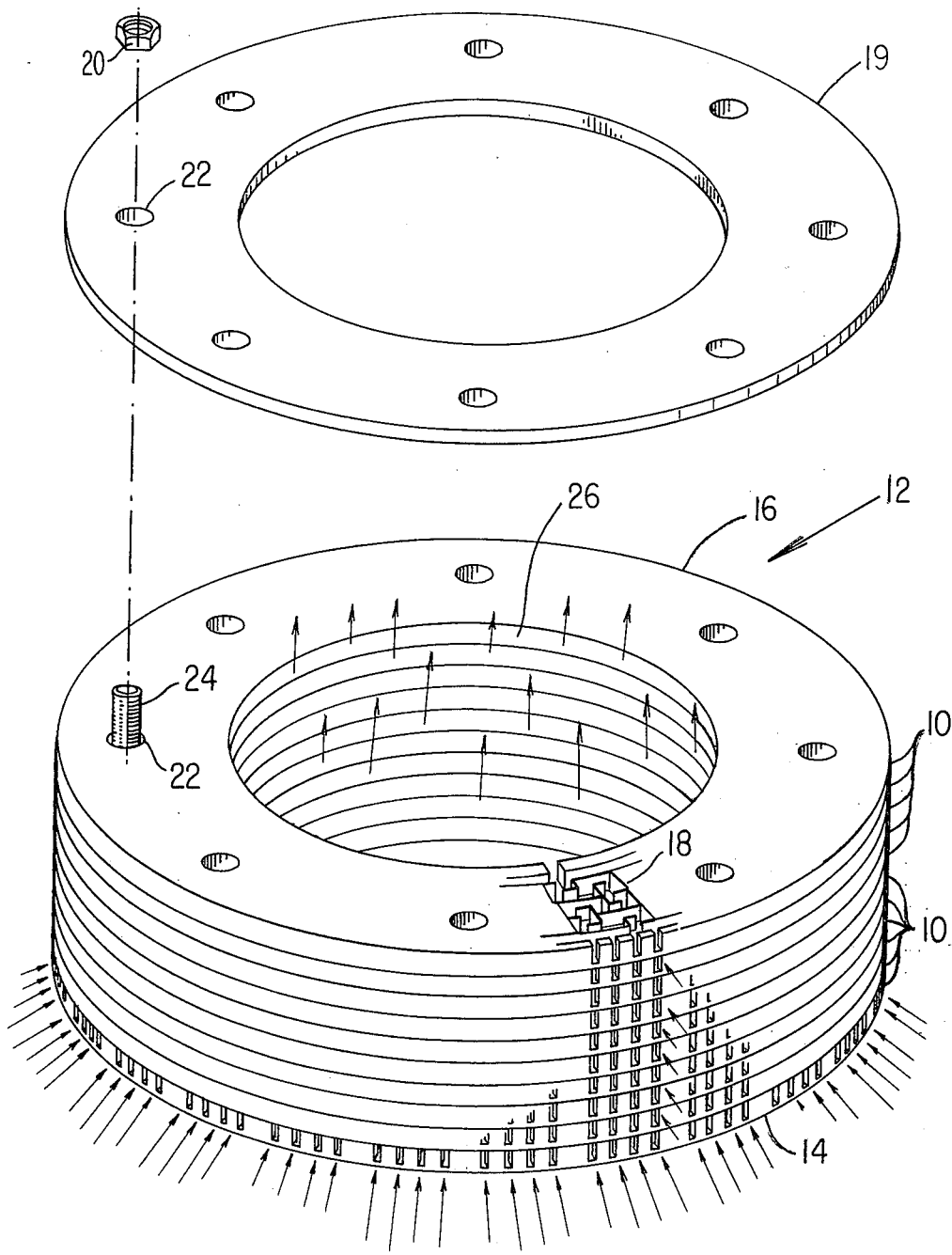
FIG. 1 is a perspective view of a multi-turn labyrinth disk stack utilizing the disks of the present invention.
Figure 2:
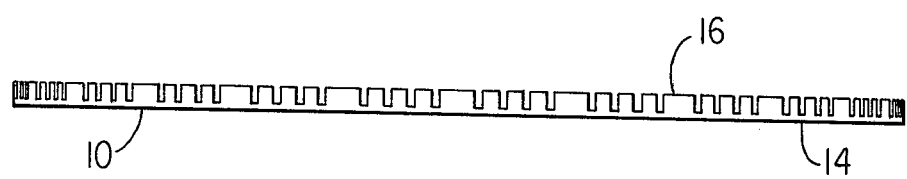
FIG. 2 is a side view of one disk of the FIG. 1 disk stack.
Figure 3:
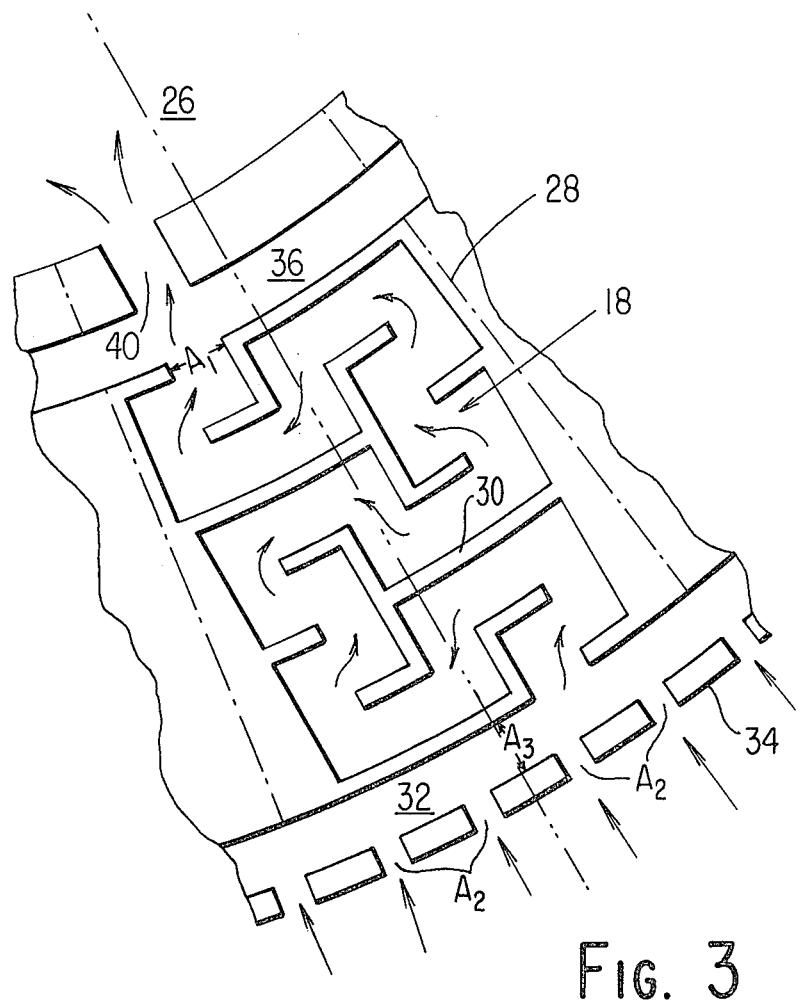
FIGS. 3 and 3a are top views of the FIG. 2 disk.

Turning now to FIGS. 1 through 3, it will be seen that a series of disks 10 may be stacked together into a disk stack assembly 12 by having the bottom surface 14 of one disk 10 placed on top of the top surface 16 of the adjoining disk 10 thereby sealing the multi-turn labyrinths 18 of each disk 10 with the flat bottom surface 14 of the adjoining disk 10. The very last top disk of the stack assembly 12 may be sealed with a flat cover sheet 19. The disk stack assembly 12 is held together in a well-known manner by means such as a series of nuts 20 extending through aligned alignment holes 22 of each disk 10 to hold the disk assembly 12 in proper orientation and rigidity. Bolts 24 are threaded onto the nuts 20 to compress the disk stack 12 and prevent fluid leakage therefrom although the stack assembly 12 could also be preloaded and brazed into a single unit. The assembled disk stack assembly 12 may then be inserted into various devices such as control valves which are used to reduce fluid pressure as well as the noise usually present in many pressure reducing control techniques.

This particular disk stack assembly 12 is intended to allow fluid flow from the external periphery of the disk stack assembly 12 through each of the multi-turn labyrinth paths 18 of each disk 10 of the disk stack assembly 12 and into a common central opening 26 of the disk stack assembly 12 from where it is exhausted.

With particular reference to FIGS. 2 and 3, it will be understood that each disk 10 has 24 sectors 28 each having a multi-turn labyrinth assembly 18 defining a fluid flow path of approximately 24 turns and of substantially identical width. Since the height of the lands 30 defining the multi-turn sector labyrinths 18 is substantially identical, the cross-sectional area of the labyrinth passage 18 is substantially identical and shall be referred to as area $A_1$.

A high capacity circumferential passage 32 is located along the outside periphery of each sector 28 and supplies fluid to all of the 24 sector passageways 18. An integral filter screen 34 is circumferentially located proximate to the circumferential passage 32. The cross-sectional area of the high capacity common circumferential passage 32 shall be referred to as $A_3$ and this area $A_3$ is made greater than the area $A_1$ of the labyrinth passageway 18 to insure that the passage 32 will be able to supply fluid to all 24 sectors of the labyrinth passageways 18.

The integral screen assembly 34 has multiple inlet passages per sector, each passage having a cross-sectional area $A_2$. The total area of the inlet passages $A_2$ is made to be also greater than the area of the labyrinth passage $A_1$ to insure sufficient fluid flow to the passage 32. From the forementioned area ratios, it will be seen that the relative velocity of the fluid flowing through the screen areas $A_2$ is relatively low in velocity as compared to the fluid velocity in the passageways 18 which have an area of $A_1$. Should some of the integral filter screen 34 areas $A_2$ be blocked, the fluid flow would increase through the remaining areas $A_2$ but they would still feed the common high capacity circumferential passage 32 in sufficient quantity to allow fluid to be supplied to the entire labyrinth passageways 18 of the entire disk 10. In fact 70 to 80 percent of the areas $A_2$ would have to be blocked before flow would be impaired to the passageways 18.

The outlet of the multi-turn labyrinth 18 exhausts into a common outlet ring 36 used to equalize pressure at the outlet of the disk. This ring 36 equalizes the pressure and flow through the passages 18 which may be throttled by plug (not shown) movement in the central outlet 26. Such a pressure equalization ring 36 tends to eliminate plug vibration and controls the tendency for the plug to move tightly against one side of the bore with resulting increased friction and wear on that side of the bore. An outlet 40 extends from the pressure equalization ring 36 into the central opening 26 to allow the fluid which has been reduced in pressure to be exhausted evenly out of the disk stack 10, 12.

Figure 3A:
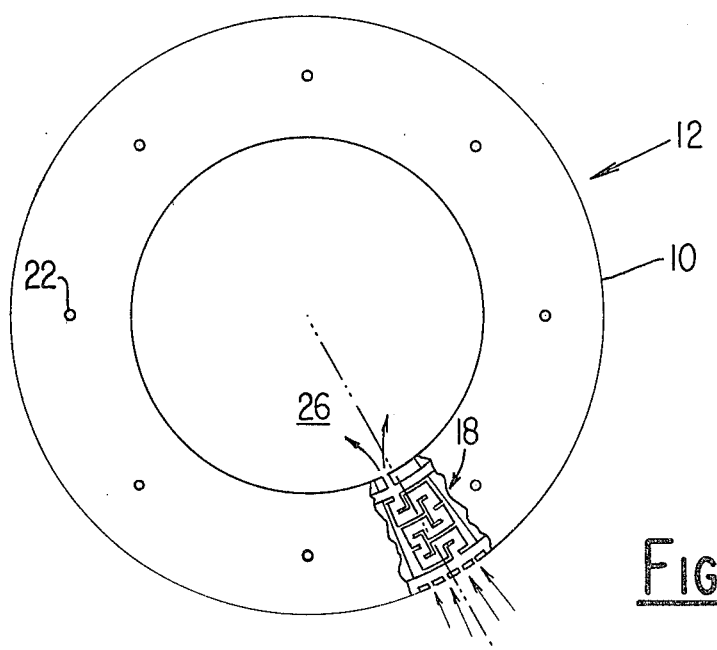

Certain modifications and improvements will occur to those skilled in the art upon reading this specification. As an example the integral filter screen could be located on the inner diameter of the stack as opposed to the shown location on the outside diameter of the stack. The invention is equally applicable to a steam or gas pressure reduction valve where the fluid is compressible and expands proportional to the progressive pressure reduction steps, necessitating a progressively expanding passage area $A_1$ rather than the constant area $A_1$ required for noncompressible liquids as described above and pictured in FIGS. 1, 3, and 3a. It will be understood that such improvements and modifications have been deleted herein for the sake of conciseness and readability but are properly intended to be within the scope of the following claims.

I claim:

1. A device for subjecting particulate fluid flow to a labyrinth passage between the inlet and outlet of the device comprising:

a multi-turn labyrinth disk stack with integral inlet filter having a series of disks with inlet and outlet circumferences forming the inlet and outlet of said disk stack;

means for allowing fluid flow in the device to flow from the inlet circumference of the disk stack to the outlet circumference of the disk stack;

each disk of said series having a series of small area openings located around the entire inlet circumference of said disk forming an inlet filter for the particulate fluid flow through the device and leading to a large circumferential passageway;

each of said series of disks having a series of multi-turn passages located proximately to said large circumferential passageway, each multi-turn passage having a substantially constant area significantly larger than the area of each of said series of circumferential passages to prevent the blocking of the passageway by a particle of the particulate fluid flow passing through the inlet filter of said disk; and outlet means located on each of said series of disks proximate to said multi-turn passages to exhaust the particulate fluid from the disk stack of the device.

2. A disk stack as set forth in claim 1 wherein said outlet means on each of said series of disks includes a pressure equalization passageway radially extending proximate to the outlet of said series of multi-turn labyrinths.

3. A disk stack as set forth in claim 1 wherein the area of said multi-turn labyrinth passages of each of said series of disks is significantly less than the total area of the series of small openings.

4. A disk stack as set forth in claim 3 wherein on each of said series of disks the area of said large circumferential passage is significantly larger than the area of one of said multi-turn passages.

5. A disk stack as set forth in claim 4 wherein on each of said series of disks said multi-turn passages are formed by lands extending from the surface of said disk to a common height to allow a flat surface to seal the passageways therebetween.

* * * * *

UNITED STATES PATENT AND TRADEMARK OFFICE
CERTIFICATE OF CORRECTION

PATENT NO. : 4,267,045
DATED : May 12, 1981
INVENTOR(S) : ROBERT G. HOOF

It is certified that error appears in the above—identified patent and that said Letters Patent are hereby corrected as shown below:

Drawing Page, Sheet 2 of 2, FIG. 3, the arrow to the left of element 30 should be pointing in the opposite direction.

Signed and Sealed this

Eighteenth Day of August 1981

[SEAL]

Attest:

GERALD J. MOSSINGHOFF

Attesting Officer  Commissioner of Patents and Trademarks